July 28, 1959     G. E. BUSKE ET AL     2,896,603

POWER TAKE-OFF FOR LAWN MOWERS

Filed Feb. 27, 1956     2 Sheets-Sheet 1

INVENTORS
GILBERT E. BUSKE &
RUSSELL L. MORDEN
BY
ATTORNEYS.

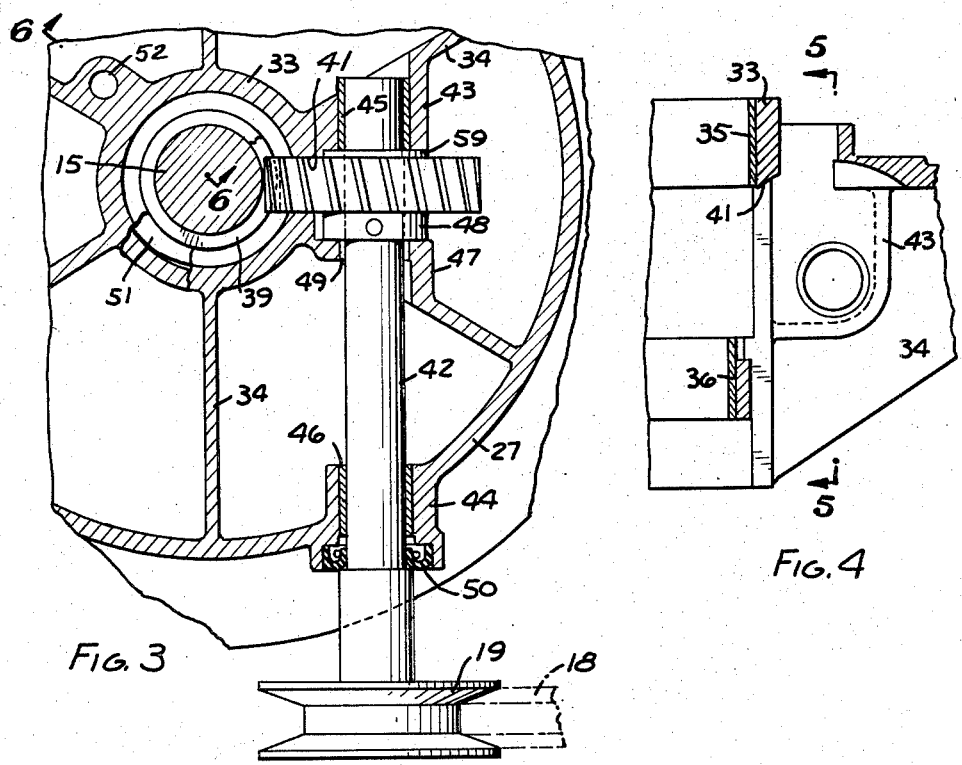
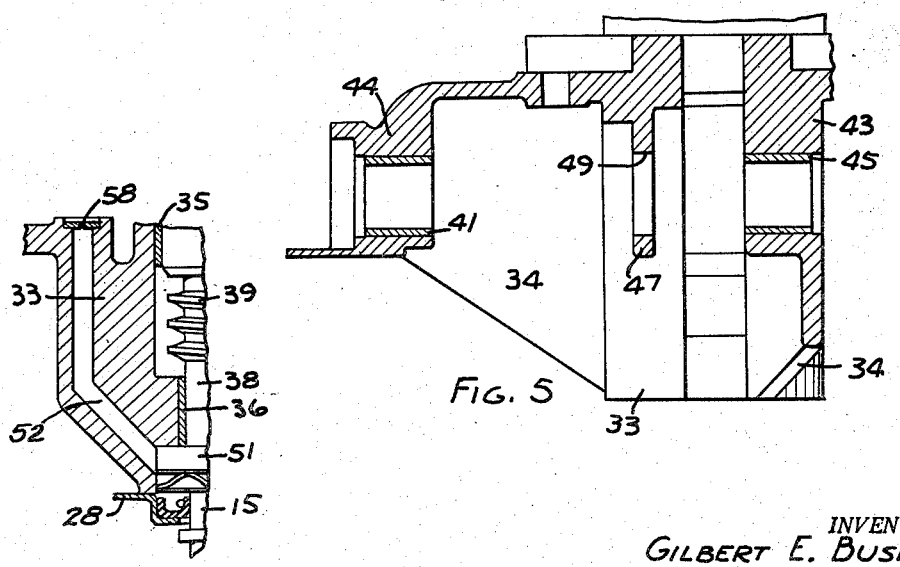

United States Patent Office 2,896,603
Patented July 28, 1959

2,896,603

POWER TAKE-OFF FOR LAWN MOWERS

Gilbert E. Buske and Russell L. Morden, Lansing, Mich., assignors to Motor Wheel Corporation, Lansing, Mich., a corporation of Michigan Application February 27, 1956, Serial No. 567,826

3 Claims. (Cl. 123—195)

This invention relates to internal combustion engines and particularly to a power take-off for lightweight internal combustion engines such as are used with lawn mowers and the like.

In one type of power lawn mower, a lightweight internal combustion engine is mounted on the wheel-supported housing of the mower with the crankshaft thereof extending generally vertically. A rotary blade is mounted on the lower end of the crankshaft for rotation in a horizontal plane. A power take-off from a small engine is used to drive the mower along the ground. In some prior art mowers, the power take-off comprises a mechanism which is added to the engine and results in increasing the overall size of the engine. An additional disadvantage is that, in most instances, it is difficult to lubricate the power take-off mechanism and therefore some auxiliary lubricating mechanism must be used. Another disadvantage of such power take-off mechanisms is that certain portions thereof outside of the engine are rotating at high speed which necessitates the frequent lubrication by the user. This places an undesirable burden on the average user. In addition, such power take-off mechanisms are relatively expensive and increase the cost of the lawn mower materially. A further disadvantage of such power take-off mechanisms is that they require a substantial redesigning of the engine and, as a result, the same basic engine cannot be used in a production line for manufacturing engines with and without the power take-off mechanism.

It is an object of this invention to provide a power take-off which utilizes a minimum number of parts and is a part of the internal combustion engine.

It is a further object of the invention to provide such a power take-off which is positioned within the normal confines of the engine and does not increase the overall size of the engine.

It is a further object of this invention to provide such a power take-off which is lubricated by the same system which lubricates the several parts of the engine.

It is a further object of this invention to provide such a power take-off which is positioned within the crankcase of the engine and is lubricated by the same lubricant as is used to lubricate the several parts of the engine.

It is a further object of this invention to provide such a power take-off wherein substantially all of the reduction in speed is achieved within the confines of the engine and the moving parts of the power take-off outside the engine are moving slowly enough so that they do not have to be lubricated at frequent intervals.

It is a further object of this invention to provide such a power take-off which is simple in construction, utilizing a minimum number of parts, and may be manufactured at a low cost.

It is a further object of this invention to provide such a power take-off which requires a minimum of redesigning of the engine so that the same basic engine may be used in a production line for the manufacture of engines with and without power take-off.

In the drawings:

Fig. 3 is a sectional view along the line 3—3 in Fig. 2.

Fig. 4 is a fragmentary sectional view similar to Fig. 2 showing various parts removed.

Fig. 5 is a sectional view taken along the line 5—5 in Fig. 4.

Fig. 6 is a sectional view taken along the line 6—6 in Fig. 3.

Figure 1:
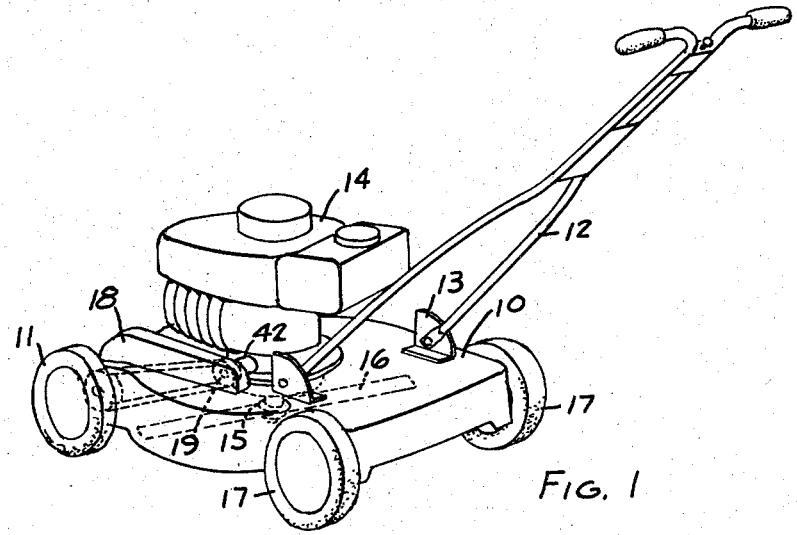
Fig. 1 is a perspective view of a power lawn mower including an engine which embodies the invention.

Referring to Fig. 1, a power lawn mower may comprise a housing 10 provided with wheels 11, 17 whereby it may be moved along the ground. A handle 12 is pivoted on brackets 13 for guiding the movement of the mower along the ground. An engine 14 of the internal combustion type is mounted on the top of the housing 10 and is provided with a vertical shaft 15 extending downwardly and having a rotary cutting blade 16 mounted on the lower end thereof for rotation in a substantial horizontal plane. An auxiliary power shaft 42 projects laterally and horizontally from the engine 14 and the wheels 11 may be driven by said shaft 42 through a belt 18 connected to the wheels 11 and trained over a pulley 19 mounted on the shaft 42.

Figure 2:
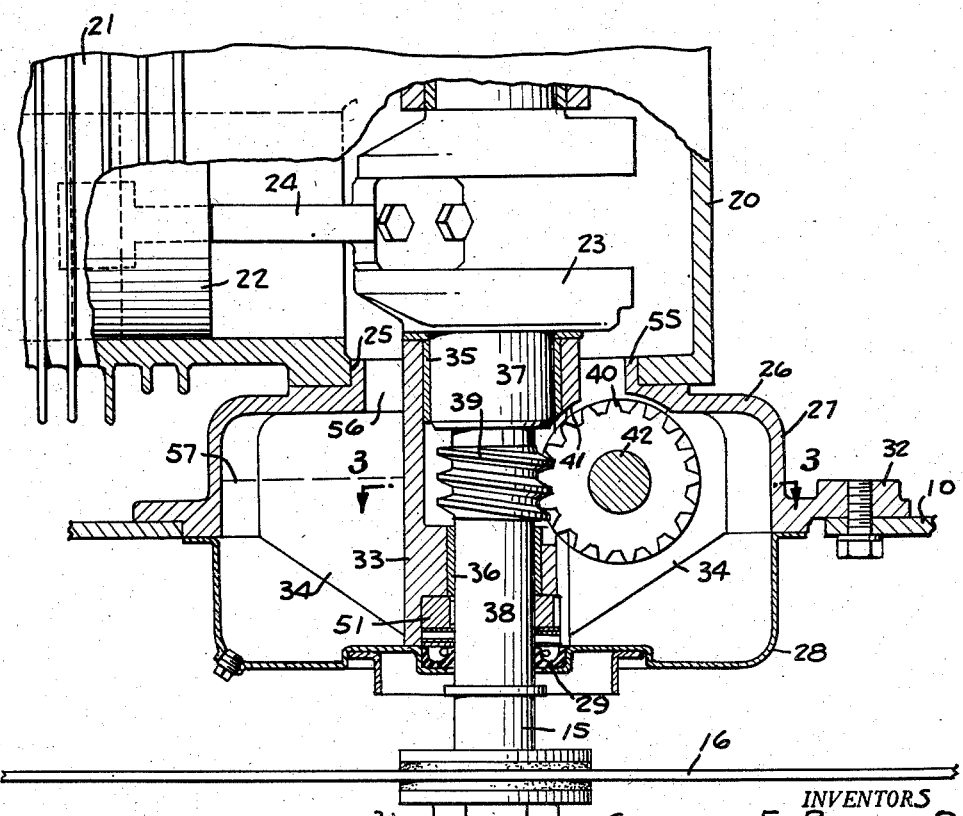
Fig. 2 is a fragmentary vertical sectional view of the engine embodying the invention.

The engine shown in Fig. 2 is similar to that disclosed and claimed in the copending application of Russell L. Morden, Serial No. 511,490, filed May 27, 1955, now abandoned, covering Lubricating Structure for Motors. Engine 14 comprises a cylinder block which includes a cylinder 21, upper part 20 of the crankcase and piston 22 mounted for reciprocating movement horizontally within cylinder 21. Crankshaft 15 has a crank 23 connected to piston 22 by a connecting rod 24. Upper part 20 of the crankcase is formed with an opening 25. A bearing adapter 26 having a downwardly extending peripheral wall 27 is provided with flange 55 which is seated in opening 25. A cup-shaped pan 28 is secured below the adapter 26 in complementary sealing relationship thereto. By this construction, the lower part of the crankcase is formed so that the crankcase of the engine extends from the area of the crank 23 downwardly through the opening 25 into the area of adapter 26 and oil pan 28 with the lowermost portion of the crankcase forming an oil reservoir. The end of shaft 15 projects downwardly through an opening in pan 28 and an oil seal 29 is provided to prevent the escape of oil through the opening. The rotary blade 16 is mounted on the end of the shaft 15 in any suitable manner, for example, by a nut 31 threaded on the end of the shaft.

The engine is supported on mower housing 10 by means of peripheral flange 32 projecting outwardly from the lower end of adapter wall 27.

Adapter 26 is provided with an integral central hub 33 supported by reinforcing ribs 34 which extend radially in a vertical plane between the hub and wall 27 of adapter 26 (Figs. 2, 3). A circumferential clearance 56 is provided between hub 33 and flange 55. Hub 33 is provided with vertically spaced bearings 35, 36 in which shaft 15 is journalled. Shaft 15 has a greater diameter in portion 37 adjacent the bearing 35 than in the portion 38 adjacent the bearing 36.

Shaft 15 is formed with a worm 39 intermediate the portions 37, 38. As shown in Fig. 3, a worm gear 40 meshes with worm 39 and extends through an opening 41 in hub 33. Gear 40 is pinned to a short shaft 42 which has one end thereof journalled in boss 43 formed integrally with hub 33 and the adjoining portion of ribs 34. The other end of the shaft 42 projects through boss 44 in wall 27 of the adapter. Bearings 45, 46 are carried in bosses 43, 44, respectively. In order to absorb the axial thrust outwardly on gear 40 and shaft 42, an intermediate or third boss 47 is provided against which hub portion 48 of gear 40 bears. The opening 49 in the boss 47 is greater than the diameter of the shaft 42. Axial thrust inwardly on the gear 40 and shaft 42 is absorbed by the boss 43 against which hub portion 59 of gear 40 bears. An oil seal 50 surrounds the end of the shaft 42 which projects through the adapter.

Referring to Fig. 2, the engine may be provided with lubricating mechanism whereby the oil in the reservoir is forced upwardly to lubricate the various parts thereof, including the piston 22, crank 23 and connecting rod 24 with their bearings. Such lubricating mechanism may comprise a pump 51 actuated by rotation of the shaft 15 to force oil upwardly through a channel 52 in the hub 33 and orifice 58 onto the crankshaft, connecting rod and piston. The particular lubricating system is shown in detail in the application of Russell L. Morden, Serial No. 511,490, filed May 27, 1955, now abandoned. The oil which is forced upwardly to lubricate the various parts of the engine drains from the upper part 20 of the crankcase back to the reservoir through clearance 56.

The oil level represented by the dotted line 57 in Fig. 2 is such that a major portion of hub 33 is submerged, including a part of worm 39 and worm gear 40. This insures proper lubrication of worm 39 and worm gear 40. The portion of shaft 15 which projects into the adapter is supported in the hub by bearings 35 and 36 thereby providing the necessary rigid support for the shaft 15 and preventing its bending during rotation.

When the engine is in position on a lawn mower and is operated, the rotation of the vertical shaft not only rotates the blade 16 to cut the grass but, in addition, rotates the auxiliary power shaft 42 through the worm 39 and worm gear 40 to drive the wheels, thereby moving the lawn mower along the ground. The power take-off mechanism comprising worm 39 and gear 40 is positioned within the crankcase of the engine and, as a result, the overall size of the engine is not increased. The mechanism comprises a minimum number of parts. The power take-off is lubricated by the same lubricant which lubricates the various parts of the engine. The lubrication is efficient, since oil is provided to the power take-off, not only by normal splashing but, in addition, by the downward drainage of oil from the upper part of the crankcase.

The reduction in speed provided by the power take-off is such that the shaft 42 which projects outside of the engine is rotating at a relatively low speed. Accordingly, the parts which are connected to the shaft 42 for driving the lawn mower are rotating at a sufficiently slow speed that they do not have to be lubricated. This eliminates an undesirable burden from the user. Since the construction is relatively simple and the number of parts is few, the cost of the power take-off is low.

The same basic engine construction may be used to manufacture an engine with and without the power take-off. If it is desired to manufacture an engine without the power take-off, a main bearing adapter is used without the shaft 42 and bosses 43, 44 and 47. The same crankshaft may be used in making an engine with or without the power take-off. The construction of the engine without the power take-off is shown in the copending application Serial No. 511,490 previously referred to.

We claim:

1. In an internal combustion engine, the combination comprising a body, a vertical crank shaft having a crank, said body including an opening in the lower end thereof through which said crank shaft projects downwardly, a bearing adapter mounted on said body below said opening and having a hub projecting upwardly into said opening into said body, said hub having an axial bore, said crank shaft having the lower portion thereof projecting downwardly through said axial bore and supported exclusively by said hub, means surrounding said hub and cooperating with said adapter to form an oil reservoir, a worm fixed on the portion of said crank shaft which extends downwardly through the opening in said body, a horizontal power take-off shaft journaled in said adapter on opposite sides of said worm, one end of said power take-off shaft projecting through a portion of said adapter, and a worm gear fixed on said power take-off shaft and meshing with said worm on the lower portion of said crank shaft, at least a portion of said worm and worm gear projecting downwardly below the normal level of oil in said reservoir.

2. The combination set forth in claim 1 wherein said bearing adapter is formed with a pair of spaced bosses, said power take-off shaft being journaled in said bosses.

3. The combination set forth in claim 2 wherein said bearing adapter is provided with a third boss abutting the side of the worm gear and thereby absorbing axial thrust of the worm gear in one direction, one of said pair of bosses in said adapter abutting the other side of the worm gear and thereby absorbing axial thrust of the worm gear in the opposite direction.

References Cited in the file of this patent

UNITED STATES PATENTS

| | | |
|---|---|---|
| 1,395,590 | Moses | Nov. 1, 1921 |
| 1,430,524 | Kettering | Sept. 26, 1922 |
| 2,466,256 | Messner | Apr. 5, 1949 |
| 2,533,575 | Ginn | Dec. 12, 1950 |
| 2,539,619 | Goodall | Jan. 30, 1951 |
| 2,582,177 | Swisher | Jan. 8, 1952 |
| 2,630,881 | Bosma | Mar. 10, 1953 |
| 2,645,305 | Roos | July 14, 1953 |
| 2,705,002 | Bosma | Mar. 29, 1955 |
| 2,705,056 | Bruns | Mar. 29, 1955 |
| 2,714,436 | Heisler | Aug. 2, 1955 |
| 2,747,563 | Doster | May 29, 1956 |